United States Patent [19]

Anderson

[11] 3,775,751

[45] Nov. 27, 1973

[54] METHOD OF AND APPARATUS FOR BAUD RATE DETECTION

[76] Inventor: Duane H. Anderson, 2292 West Laurie Road, Roseville, Minn. 55113

[22] Filed: Mar. 17, 1972

[21] Appl. No.: 235,836

[52] U.S. Cl. ...... 340/172.5, 179/15 BV, 179/15 BA, 325/40

[51] Int. Cl. ............................. G06f 3/04, H04j 7/00

[58] Field of Search .................. 340/172.5; 325/320, 325/40; 179/15 BV, 15 BA

[56] References Cited

UNITED STATES PATENTS

| | | | |
|---|---|---|---|
| 3,670,250 | 6/1972 | Fritkin | 325/320 |
| 3,611,298 | 10/1971 | Jacobson | 325/320 |
| 3,522,539 | 8/1970 | Levine et al. | 325/320 |
| 3,056,085 | 9/1962 | James et al. | 179/15 BV |
| 3,668,645 | 6/1972 | Reymond et al. | 340/172.5 |

*Primary Examiner*—Gareth D. Shaw
*Attorney*—Alfred E. Hall

[57] ABSTRACT

A communication system with baud rate detection capability. In a preferred embodiment of the system, the system includes a processor, a plurality of terminals, and a communication device for coordinating transmission, at a variety of baud rates, of messages between the processor and terminals. The signal by which each message is transmitted includes in the initial portion thereof a baud-rate-code as represented by at least one time interval between signal state transitions. The communication device detects the signal state transitions representative of the baud-rate-code and the time of occurrence of each such detected transition is recorded. From a pair of recorded times, a transition interval is computed and the baud rate corresponding to the computed time interval is determined.

5 Claims, 3 Drawing Figures

METHOD OF AND APPARATUS FOR BAUD RATE DETECTION

RELATED APPLICATION

This application is related to the subject matter of application Ser. No. 235,568 for an invention of Fritz H. Schulze for method and apparatus for Baud Rate Detection, which related application was filed concurrently herewith and is assigned to the same assignee as the present invention.

BACKGROUND AND FIELD OF THE INVENTION

The present invention relates to baud rate detection in general, and in particular to such detection in a data processing system of the type wherein a communications device coordinates asynchronous communications between a processor and a plurality of terminal devices.

Briefly, baud rate detection consists of determining the speed of transmission of a signal by a device receiving the signal in order that the receiving device may correctly decode the signal. Typically, the signal is a binary coded signal, i.e., a two-state signal, one state being commonly referred to as a "mark" state and the other state being referred to as a "space" state.

The "computer dictionary and handbook," by Charles J. Sippl, Howard W. Sams & Co., Inc. Library of Congress, Catalog Card No. 66-21405, in substance, defines mark and space signal states for circuits in which current flow is in only one direction, as follows:

Mark: an impulse the characteristics of which correspond to current flow in the circuit, i.e., to a closed circuit;

Space: an impulse the characteristics of which correspond to no current flow in the circuit, i.e., to an open circuit.

The foregoing circuits of uni-directional current flow are known as "neutral" circuits; for bidirectional current flow circuits, "polar" circuits, space and mark state signals correspond to the respective current flow directions.

The unit of information of a binary signal is referred to as a bit and thus a signal is composed of mark and space bits. Inevitably, a message includes successive bits of the same state resulting in multibit segments which must be subdivided or "decoded" into the proper number of bits, the number of bits of any particular segment being a function of the segment length and signal baud rate.

To aid those not experienced in the matter of electronics in general and in baud rate detection in particular to form a mental image of how the baud rate affects the decoding of a multi-bit segment, a graphic representation of the signal waveform of a transmitted message shall be described. A message transmitted over a communication line in the form of a binary signal is typically represented in graphic form as a line which, although continuous, makes abrupt transitions between two levels. One level corresponds to the mark signal state and the other to the space state. The signal segments thus alternate between mark and space level, and as previously mentioned, most, if not all signals will include segments representative of a plurality of bits requiring that the length of an individual bit be known in order to divide multiple bit length segments of the same state into the proper number of bits. Translating this graphic image into the signal electrical characteristics, signal "level" becomes either a current or voltage magnitude and "length" becomes time, the unit of time being the length of a single bit. Baud rate is derived from the bit time, specifically, baud rate is the reciprocal of a bit time.

Baud rate detection is very important in data processing systems. The high cost of the communication lines used to interconnect processors and terminal devices in a communication system and the high cost of the logic equipment for interconnecting the processors and terminal devices to the lines, makes it highly desireable to minimize the number of communication lines required in a system and to use those which are required as efficiently as possible. As a general rule, efficient use and minimization of communication lines requires that a number of terminal devices share a communication line or that a greater number of devices share a group of communication lines. Suffice it to say that terminal devices vary widely in their rates of communication and that the number of devices in a system which transmit at the same rate seldom is a number which would provide efficient use and minimization of lines by having those devices which transmit at the same rate share a communication line. Although sharing of communication lines by devices which transmit at the same rate is sometimes effective, for many applications the approach is inefficient.

Another approach which is known is one in which devices transmitting at different rates share a common path by prefacing each message with a bit pattern representative of baud rate. With such an approach, code detection means are included in the receiving device for detecting the bit pattern, means are provided for decoding the detected pattern, and further means are provided for conditioning the receiving device to receive at the rate specified by the pattern. In this approach, each bit must of course be correctly detected and thus the error rate of this approach is directly related to the length, i.e., to the number of bits, in the pattern, the approach being susceptible to bit-errors such as those errors caused by what is commonly referred to as telegraph distortion. Furthermore, the approach requires a considerable amount of hardware for decoding the pattern, the exact amount being directly related to the number of patterns to be decoded. If this approach is to provide system flexibility by specifying a baud rate in a variety of different ways, i.e., by specifying one baud rate by each of several different bit patterns, even more hardware is required since each additional pattern requires some additional hardware.

The present invention has as a general object provision of an efficient and reliable method of and means for baud rate detection, and has, by way of example and not limitation, the specific objects hereinafter recited.

An object of the present invention is to provide a method of and means for baud rate detection which is particularly amenable to use in a data processing system for determining the baud rate of asynchronous transmissions.

A further object of the present invention is provision of a communication system in which terminal devices the transmission rates of which are different can share a communication line to provide an efficient and economical system by minimizing the number of and efficiently using communication lines.

Still another object of the present invention is provision in a communication system of baud rate detection of a type permitting representation of a baud rate in a variety of different ways to provide system flexibility in the designation of baud rate.

A still further object of the present invention is a communication system having baud rate detection in which the reliability of the detection approach is directly related to the length of the pattern in which the baud rate is represented to detect baud rate with a high degree of reliability.

BRIEF DESCRIPTION OF THE INVENTION

Briefly, the invention comprises a method of and means for determining baud rate from the transitions of a signal. According to the method of the present invention, each rate of transmission by convention corresponds to a baud-rate-code, which baud-rate-code, is an interval, or intervals, of time. The signal by which each message is transmitted includes signal state transitions the interval or intervals of which correspond to the baud-rate-code, and hence correspond to the baud rate at which the message is to be transmitted. The means for determining the baud rate includes means for monitoring a received signal to detect each signal state transition. Computational means responsive to detection of a said change of state provides an indication of the time of occurrence of the change of state. Means are provided for operating upon at least two of said indications of time to compute the transition interval between the transitions and to indicate the baud rate corresponding to the transition interval, or intervals, as the case may be. Means are provided which are responsive to condition the receiving device to receive the message at the indicated rate.

According to a preferred embodiment of the invention specifically intended for use in a data processing system, the communication system includes a data processor, a plurality of terminal devices, and a communication device for coordinating communications between the processor and the terminal devices. The communication device includes monitoring means which in response to detection of a baud-rate-code signal state transition generates a "baud-rate-detection-interrupt" and transmits the interrupt to the processor. The processor responds to the interrupt in its proper order by storing the time of a clock as an indication of the time of occurrence of the transition. Depending upon the particular convention adopted by the system, the processor upon receiving the last of a predetermined number (at least two) of such interrupts, operates upon the stored indications of time to compute the transition interval or intervals therebetween and determines the baud rate corresponding to the interval or intervals. The processor transmits a signal representative of the determined baud rate to the communication device which is conditioned in accordance with the signals to receive the communication at the appropriate baud rate.

Such a data processing system embodiment as described above, in essence, permits a variety of bit patterns to each specify the same baud rate. Because the code is independent of the state of the bits comprising the signal, but is instead a function of the interval between transitions from one to another state, and since the transitions used to specify an interval need not be successive transitions, the bit pattern in between the transitions defining the interval can vary in every possible way and can be used as information bearing bits to provide even greater system flexibility. Such transition decoding also eliminates any need for duplicate decoding hardware for decoding different bit patterns which specify the same baud rate.

It will also be appreciated that such a transition detection approach provides a highly reliable and economical system since the cost of the system is independent of the bit-length of the baud-rate-code. Because the baud-rate-code can conveniently be made to be several bits long, the probability of errors such as errors caused by telegraph distortion is reduced.

Moreover, the embodiment for a data processing system described above provides a particularly efficient system when included in a data processing system having means for expediting processing of a baud-rate-detection-interrupt. See, for example, the system described in the U.S. Letters Pat. No. 3,599,162 for Priority Tabling and Processing of Interrupts, invented by Paul D. Byrnes et al, and assigned to the same assignee as the present invention.

DETAILED DESCRIPTION OF DRAWINGS

Figures 1, 2, 3:
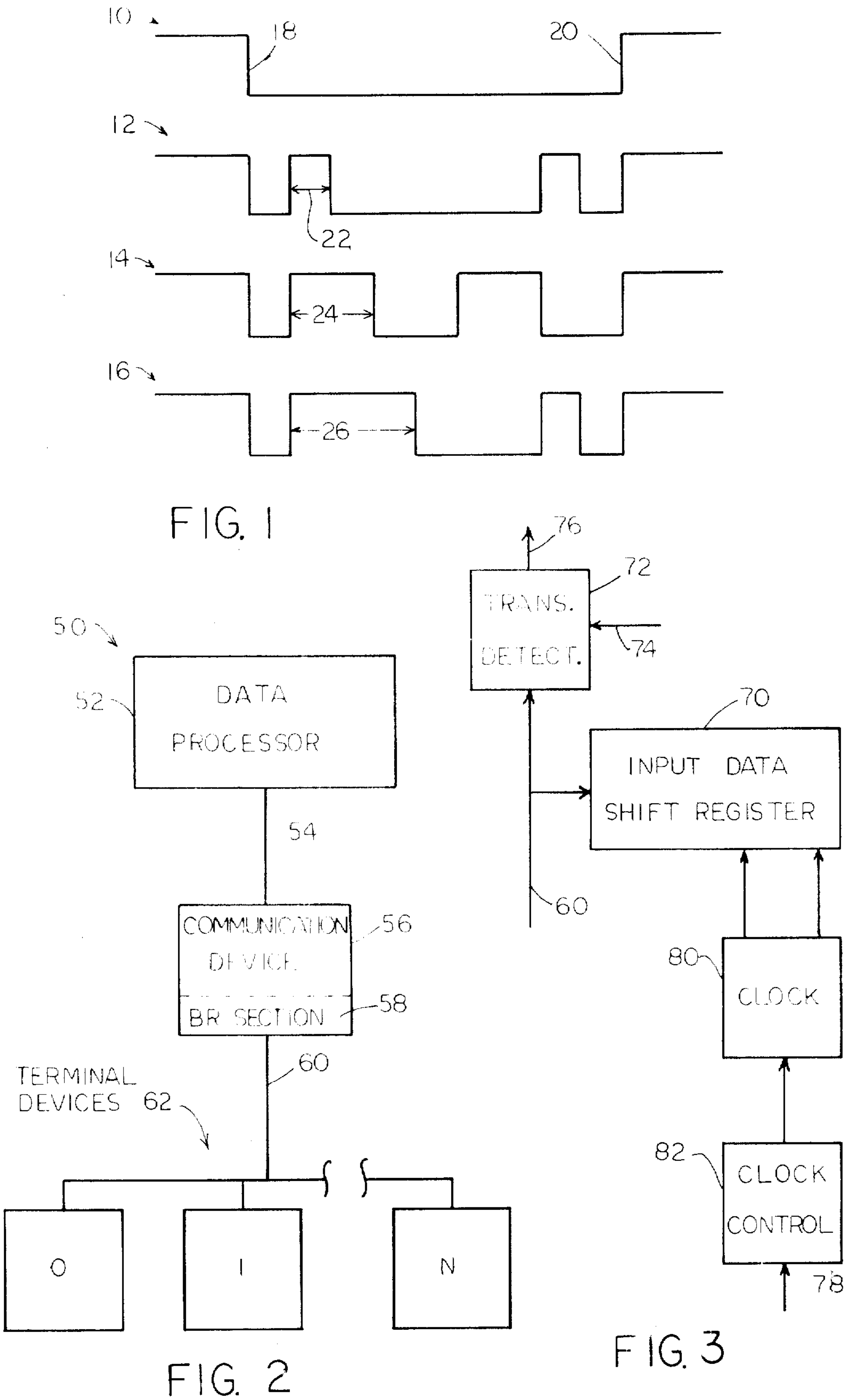
FIG. 1 is an illustration of four waveforms all of which are different yet each of which include the same baud-rate-code.
FIG. 2 is a block diagram of a data processing system incorporating the present invention.
FIG. 3 is a block diagram of the baud rate section of the system illustrated in FIG. 2.

Referring now to FIG. 1, waveforms 10, 12, 14, and 16 are shown. Waveform 10 is a simple waveform, consisting only of a start transition 18 and a stop transition 20. Waveforms 12, 14, and 16 are a set of complex waveforms each of which, while having an interval between transitions which is identical to the interval between transitions 18 and 20 of waveform 10, also include additional transitions. The added intervals formed by the additional transitions may also be information bearing representations of data or commands. They may, for example, represent such things as the bit length of the characters in the message of the baud-rate-code, the parity of the message characters, the code convention (ASCII, EBCDIC, etc.) of the message, or in a multiprocessor system, which one of the several processors the message is to be sent to. The intervals between the second and third transitions of each of waveforms 12, 14 and 16, which intervals are respectively designated as 22, 24, and 26, illustrate how the set of waveforms 12, 14, and 16 could each specify the same baud rate and also each specify additional different information. Thus each of waveforms 12, 14, and 16 could be generated by one of three different terminals, all of which transmit at the same baud rate yet none of which are the same with respect to some other characteristic. For example, interval 22 might specify five bit characters, interval 24 eight bit characters, and interval 26 nine bit characters.

Waveforms 10, 12, 14 and 16 are graphic illustrations of a signal in which a baud-rate-code is represented as a nine bit interval, for waveform 10 the interval between the first and second transitions, and for each of waveforms 12, 14 and 16 the interval between the first and sixth transitions. Waveforms 12, 14 and 16 illustrate that a baud-rate-code need not be a signal the sole purpose of which is baud rate detection. The baud-rate-code can in fact be transitions of a control character, or even transitions of data bits having no particular order. In the latter case, one way of determining the baud rate is by an algorithm which computes the signal bit time and takes the reciprocal of the bit time to give baud rate.

The waveforms 10, 12, 14, and 16 are illustrated as each being nine bits in length and thus if the baud-rate-code is the interval between transitions 18 and 20 of the waveform 10 and is the corresponding interval, (between the first and sixth transitions) for each of waveforms 12, 14, and 16, it can be seen that a detection approach relatively free from errors such as those caused by telegraph distortion is provided. For, telegraph distortion, by definition, is not bit-cumulative. For an assumed maximum distortion, the total maximum telegraph distortion error is the same for transitions separated one bit length as for transitions separated, e.g., 15 bit lengths. Accordingly, the probability of error in detection of the baud-rate-code of each of nine bit waveforms 10, 12, 14, and 16, is one-ninth that of detection of baud rate from a bit pattern only one bit long. In actual practice, the probability is even less than one-ninth in most cases since a system would more than likely have more than two baud rates, the most rates specifiable by a one bit bit pattern.

The foregoing discussion relative to telegraph distortion is significant to the invention in another sense, namely as it relates to the tolerance of the set of baud-rate-codes of a particular system. A convenient way of expressing such tolerance for a data processing system is to define the baud-rate-codes as a set of ranges, such ranges being easily compared with a computed transition interval, a discrete value, by what is commonly referred to as a range search. By providing a table the entries of which comprise all the baud-rate-codes of a set, presumably one baud-rate-code per baud rate, and each being expressed in the table as a range, conversion of a discrete value computed transition interval is readily accomplished by using a range search to search the table entries for the range including the discrete value. An example of a table of ranges is given below in Table 1 for different baud rates. In Table 1, Table Entry Numbers are given in Column 1; baud rate is given in Column 2; and, a baud-rate-code for each baud rate of Column 2 is given in Column 3 as a range (a range of time in milli-seconds). Each baud-rate-code in Table 1 is accurate for telegraph distortion of up to thirty per cent but does not make allowance for other types of errors such as delays in the processing of interrupts since such errors are system dependent.

TABLE 1

| Col. 1 Entry No. | Col. 2 Baud Rate | Col. 3 Range Min. | Max. |
|---|---|---|---|
| 0 | 50 | 173 | 187 |
| 1 | 75 | 115 | 125 |
| 2 | 100 | 86 | 94 |
| 3 | 150 | 57 | 63 |
| 4 | 300 | 28 | 32 |
| 5 | 600 | 14 | 16 |
| 6 | 1800 | 4 | 6 |

Referring now to FIG. 2, a general block diagram of a data processing system 50 is shown. System 50 includes a data processor 52 connected by an I/O channel 54 to a communications device (CD) 56. Included in CD 56 is a baud rate (BR) section 58. Connected to CD 56 by a communication line 60 are a plurality of asynchronous terminal devices shown generally as 62. Only three terminal devices are actually shown, the three being identified as terminal devices 0,1, and *n*. Terminal devices 0 through *n* transmit messages at a variety of baud rates over the commonly shared communication line 60 as a result of transition detection baud rate determination as herein described. Except for the BR section 58, the above described data processing system elements are old and well known in the art. The BR section 58 can also be constructed from well known electronic circuits and logic. For example, BR section 58 comprises means for detecting signal state transitions of a signal received on communication line 60. Such transition detection means are well known in the art and include the class of circuits generally referred to as level detectors. Specific examples of well known circuits employed for transition detection are Schmidt triggers. The BR section 58 comprises means for conditioning the CD to receive a message at the rate specified by a baud-rate-code. For purposes of this description it is assumed that terminal devices 0 through n transmit all message and code signals to communication device 56 bit serially, and that communication device 56 includes an input data register, specifically, a shift register the input of which receives the signals transmitted by the terminal devices. As is well known in the art, data is shifted into a shift register under control of gating or "strobe" signals applied to the shift register strobe input at about the mid position of each received bit and at a rate equal to the baud rate of the signal being received. The BR section 58 means for conditioning the CD to receive at any particular one of a plurality of baud rates can therefore consist of an arrangement comprising a shift register the strobe input of which is coupled to a source of gating or clock pulses the rate of which are selectably controlled in accordance with signal representations corresponding to the various baud rates. The Table Entry Numbers of a table such as that of Table 1 are an example of such signal representations. Shift registers and selectably controlled clocks of the type described are also well known in the art.

FIG. 3 illustrates in block diagram form a BR section 58. The section is shown to include a shift register 70 for bit serially receiving data from communication line 60. Communication line 60 is also applied to a transition detector 72 which is activated in response to a control signal applied to input 74 to sample, i.e., to monitor communication line 60 for signal state transitions. Upon detection of a transition, an output is provided on output lead 76, which in the preferred embodiment of FIG. 2, is ultimately responded to by the processor to provide an indication of the time of occurrence of the change of state. After receiving at least two transitions, and for the Baud-rate-code illustrated in waveforms 12, 14, and 16 of FIG. 1 it would be after receiving the sixth transition, the transition interval is computed from the indications of time occurrences of the transitions. From the computed transition interval, the baud rate corresponding to the interval is determined and the baud rate indicated to baud rate section 58 on lead 78 as a signal such as the aforementioned Table Entry Number. The foregoing described operations relating to providing of time occurrences of a change of state, computing transition intervals, and providing an indication of baud rate, each are operations which are individually commonly and routinely performed in a data processor although not necessarily in the sequence described.

The BR detection section 58 includes a clock 80 which provides strobe pulses to shift register 12 and a clock control circuit 82. Clock control 82 is responsive to signals on lead 78 to activate one of its outputs, the output activated corresponding to the baud rate represented by the signal on lead 78 and causing clock 80 to apply strobe pulses to shift register 70 at said baud rate.

An example of a selectably controllable clock arrangement is set forth in the U.S. Pat. No. 3,403,226 for an invention by W.T.Wintringham, which patent issued Sept. 24, 1968. In FIG. 1 of that patent there is shown a clock arrangement capable of producing signals, such as strobe signals, at three different rates. A clock 14 produces a first signal; the first signal is applied to the "8 bit coder" logic 17 and to a pulse divider circuit 15. The pulse divider circuit provides a second signal, which second signal is provided on lead 43 and to a multiplier circuit 16. The multiplier circuit 16 provides a third signal to sampling circuit 13. Each of the three signals have different rates, the exact rate of each being a matter of design choice. Selection of one of three signals is well known in the art, and may consist of merely a three input OR gate. Each OR gate includes an AND gate one of the inputs of which is one of the three clock signals and another input of which is a control input. The control input may be conveniently provided by any of a variety of well known code translators. The control input may simply be an output of the receiving device Command Word decoding logic. In other words, each Baud Rate Code is a distinct Command Word or distinct configuration of one field of a Command Word. Such decoding logic is old and well known in the art, being included in every data processor and terminal which is operated under program control. An example of such a decoder is shown in U.S. Pat. No. 3,641,505 which issued Feb. 8, 1972 to Walter M. Artz, et. al. In that patent an "Instruction Decoder 121" is shown in FIG. 6. Fig. 10 of this latter patent also illustrates a system which would benefit when modified to include the present invention. As shown in FIG. 10, a system includes a variety of terminal devices, specifically, Tape Transports, Magnetic Disc Units, Printers, Card Punches, Card Readers, and Microfilm Readers. An Input/Output Controller 58 coordinates communications between the terminal devices and a processor (partially via an intermediary designated in the drawing as "variable stores"). The Input/Output controller 58 includes a separate Input Control Unit 211, and a separate Output Control Unit 212, although common logic may perform both the Input and Output functions. It will be appreciated that Input and Output Control Units such as those designated as references 211 and 212 may include Input and Output shift registers such as shown as reference 70 in FIG. 3 of the drawings of the instant invention. The Input/Output Controller 58 of U.S. Pat. No. 3,641,505 is also shown to include a Command Word Store 214 and a Master Control Unit 213 for decoding Command Words. It will be appreciated that any of the controllers 218, 221 and 224 could generate a baud-rate code signal and transmit it to the Input/Output Controller 58. By providing Input/Output Controller 58 with a baud rate detection section, the Input Control Unit 211 would then sample its Input line for a signal transition. Upon detection of the transition, a Baud-Rate Detection Transition Interrupt Command Word would be transferred from Command Word Store 214 under control of Master Control Unit 213 to a processor via a variable store. The processor would respond to the Interrupt by recording the time of a free-running clock. The foregoing is a given by way of illustration and not limitation and is considered one of many systems which when modified according to the teachings of the present invention will result in an improved system in which terminal devices having different baud rates share communications lines.

While the foregoing described an embodiment of the invention specifically intended for use in a data processing system, the invention for which Letters Patent is sought is not limited to such an embodiment but includes all variations and modifications of the embodiment made in adapting the invention for other applications.

What is claimed is:

1. A communications system for coordinating communications between a processor and a plurality of terminal devices, some or all of which terminal devices communicate at a different baud rate than others and each of which terminal devices is capable of prefacing a communication with a baud-rate-code, which baud-rate-code is represented as two or more signal state transitions the predetermined intervals of which specify the baud rate at which the communication shall be transmitted, comprising:

A. monitoring means for detecting signal state transitions of a baud-rate-code signal;

B. computational means responsive to said monitoring means detecting a said change of state to provide an indication of the time of occurrence of said change of state and responsive to at least two of said time of occurrence indications to compute the transition interval therebetween and to indicate the baud rate corresponding thereto; and C. means responsive to a said indication of baud rate to receive the message at the baud rate specified by said baud-rate-code.

2. A communications system according to claim 1 wherein;

said computational means is included in a data processor; and said monitoring means is included in a communication device and is responsive to detection of a said transition to generate and transmit to said processor a baud-rate- detection-interrupt, which processor is responsive to a said baud-rate-detection-interrupt to store the time of a clock as an indication of the time of occurrence of said transition and which processor operates upon at least two of said indications of time to compute the transition interval therebetween and transmits to said communication device a signal representation of the baud rate corresponding thereto to condition said communication device to receive said message at said baud rate.

3. In a communications system wherein communications are transmitted between a processor and a terminal device at a plurality of baud rates and wherein the baud rate of a particular communication is represented as at least one interval between signal state transitions in the initial portion of the signal by which the communication is transmitted, means for determining the baud rate of a transmission, comprising:

means responsive to signal state transitions of a received transmission to generate the discrete value of the difference in time of occurrence between pairs of said transitions;

means for converting a said discrete value of time to the baud-rate-code corresponding thereto and for indicating the baud rate of said baud-rate-code; and means responsive to a said indication of baud rate to receive the transmission at the rate corresponding to said baud-rate-code.

4. A method of providing transmission of a message between a processor and a plurality of terminal devices at a variety of baud rates comprising the steps of:

1. assigning each baud rate a baud-rate-code to provide a set of baud-rate-codes the individual baud-rate-codes of which are each uniquely characterized by an interval of time;
2. transmitting a message as a signal having signal state transitions, which signal state transitions define at least one interval corresponding to the baud-rate-code interval of the baud rate at which said message is transmitted;
3. receiving said signal;
4. detecting signal state transitions of said signal and recording an indication of the time of occurrence thereof;
5. operating on at least a pair of said time of occurrences to compute a said time interval corresponding to said baud-rate-code interval;
6. comparing said computed time interval with said set of baud-rate-codes to determine the baud rate corresponding to said computed time interval;
7. decoding the message at said determined baud rate.

5. In a communication system for coordinating communications between a processor and a plurality of terminal devices in which at least one terminal device communicates at a baud rate different from the communication rate of at least one other terminal and wherein at least one of the terminals or the processor includes receiving means for receiving data at a selected one of at least two of said baud rates, and in which system the communication rate at which a communication shall be transmitted is signified by a baud-rate-code as two or more signal state transitions defining a predetermined interval which corresponds to said communication rate, the improvement comprising:

A. monitoring means for detecting a signal state transition of a baud rate code signal; and B. computational means responsive to said monitoring means detecting a said transition to provide an indication of the time of occurrence of said transition and responsive to a detection of the last of a predetermined number of said transitions to compute at least one transition interval defined by two of said transitions and to provide a baud rate code corresponding to said at least one transition interval for conditioning a said receiving means to receive a communication at the communication rate corresponding to said baud rate code interval.

* * * * *